(12) United States Patent
Huang et al.

(10) Patent No.: US 11,789,984 B2
(45) Date of Patent: *Oct. 17, 2023

(54) METHODS AND SYSTEMS FOR CLASSIFYING DATABASE RECORDS BY INTRODUCING TIME DEPENDENCY INTO TIME-HOMOGENEOUS PROBABILITY MODELS

(71) Applicant: Capital One Services, LLC, McLean, VA (US)

(72) Inventors: Hao Hua Huang, Toronto (CA); Bjorn Kwok, Richmond Hill (CA)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/591,469

(22) Filed: Feb. 2, 2022

(65) Prior Publication Data

US 2022/0156290 A1     May 19, 2022

Related U.S. Application Data

(63) Continuation of application No. 16/986,101, filed on Aug. 5, 2020, now Pat. No. 11,263,242.

(51) Int. Cl.
| | |
|---|---|
| *G06F 16/28* | (2019.01) |
| *G06F 16/13* | (2019.01) |
| *G06F 17/18* | (2006.01) |
| *G06F 16/2458* | (2019.01) |
| *G06F 16/248* | (2019.01) |
| *G06N 20/00* | (2019.01) |

(52) U.S. Cl.
CPC ............ *G06F 16/285* (2019.01); *G06F 16/13* (2019.01); *G06F 16/248* (2019.01); *G06F 16/2477* (2019.01); *G06F 17/18* (2013.01); *G06N 20/00* (2019.01)

(58) Field of Classification Search
CPC .......... G06Q 40/03; G06N 7/01; G06N 20/00; G06N 3/084; G06F 16/906; G06F 17/18; G06F 16/285; G06F 16/13; G06F 16/2477; G06F 16/248; G06F 16/2462
See application file for complete search history.

(56) References Cited

U.S. PATENT DOCUMENTS

| | | | | |
|---|---|---|---|---|
| 7,933,796 B1* | 4/2011 | Buist, III | ............... | G06Q 40/03 705/36 R |
| 2012/0323760 A1* | 12/2012 | Lee | ........................ | G06Q 40/02 705/38 |

(Continued)

*Primary Examiner* — Yuk Ting Choi
(74) *Attorney, Agent, or Firm* — Perkins Coie LLP

(57) ABSTRACT

Methods and systems are described herein for improving data processing efficiency of classifying user files in a database. More particularly, methods and systems are described herein for improving data processing efficiency of classifying user files in a database in which the user files have a temporal element. The methods and system described herein accomplish these improvements by introducing time dependency into time-homogeneous probability models. Once time dependency has been introduced into the time-homogeneous probability models, these models may be used to improve the data processing efficiency of classifying the user files that feature a temporal element.

20 Claims, 5 Drawing Sheets

(56) References Cited

U.S. PATENT DOCUMENTS

| | | | |
|---|---|---|---|
| 2017/0011457 A1* | 1/2017 | Dunsky | G06Q 50/16 705/38 |
| 2018/0096267 A1* | 4/2018 | Masekera | G06Q 10/06 705/38 |
| 2018/0341760 A1* | 11/2018 | Frempong | H04W 12/63 705/38 |
| 2019/0114704 A1* | 4/2019 | Way | G06N 5/045 705/38 |

* cited by examiner

METHODS AND SYSTEMS FOR CLASSIFYING DATABASE RECORDS BY INTRODUCING TIME DEPENDENCY INTO TIME-HOMOGENEOUS PROBABILITY MODELS

CROSS-REFERENCE TO RELATED APPLICATION

This application is a continuation of U.S. patent application Ser. No. 16/986,101, filed Aug. 5, 2020. The content of the foregoing application is incorporated herein in its entirety by reference.

FIELD OF THE INVENTION

The invention relates to classifying user files in a database into states by introducing time dependency into time-homogeneous probability models.

BACKGROUND

In recent years, the amount and types of data handled by data processing networks has been exponentially increasing. The efficiency of data processing, particularly in parallel processing environments, for exponentially increasing dataset sizes, using cloud distributed computing architectures, is fundamentally limited by the efficiency of the algorithm used to partition that data for distributed storage and processing. For example, properly classifying database records allows for more efficient balancing of domain loads (e.g., by distributing network resources accordingly) by ensuring that each domain is capable of processing its load. Moreover, minimizing the number of network domains may also reduce the chances for network and routing contentions as well as the errors related to misclassification. However, as the number of network domains decreases, the need for properly classifying data into its respective domains increases.

SUMMARY

Methods and systems are described herein for improving data processing efficiency of classifying user files in a database. More particularly, methods and systems are described herein for improving data processing efficiency of classifying user files in a database in which the user files have a temporal element. The methods and system described herein accomplish these improvements by introducing time dependency into time-homogeneous probability models. Once time dependency has been introduced into the time-homogeneous probability models, these models may be used to improve the data processing efficiency of classifying the user files that feature a temporal element.

For example, the methods and systems described herein may use probabilistic forecasting to determine an estimation of the respective probabilities that a given user file may be classified into a given state. To perform the probabilistic forecasting, the methods and systems may use a time-homogeneous stochastic model with the Markov property (e.g., a Markov chain), which describes a sequence of possible events in which the probability of each future event depends only on the current state irrespective of time. Conventional systems apply time-homogeneous stochastic models to datasets in which temporally based trends affect the respective probabilities that the given user file may be classified into the given state. For example, datasets in which the number of, and results of, a series of status checks on a user file may affect the respective probabilities that the given user file may be classified into the given state are ill-suited for time-homogeneous stochastic models. That is, conventional systems do not allow for this time-inhomogeneity in their models.

The methods and systems described herein overcome the technical problems of conventional systems in applying stochastic models to datasets in which the number of, and results of, a series of status checks on a user file may affect the respective probabilities that the given user file may be classified into the given state. Specifically, the methods and systems described herein introduce a time dependency into time-homogeneous probability models. That is, the methods and systems described a time-inhomogeneous Markov chain. Moreover, the manner in which the time dependency is introduced is dependent on criteria related to the user files to be classified, and the states into which the user files are to be classified. For example, as described herein, the methods and systems may introduce the time dependency into the stochastic models by retrieving a user file history for a user file, wherein the user file history comprises periodic status checks. The system may then generate a feature input for the user file history based on a respective user file status at each of the periodic status checks. The system may then determine a number of periodic status checks in the user file history. The system may then select a first stochastic probability model of a plurality of stochastic probability models based on whether or not the number of the periodic status checks in the user file history correspond to a first range. In such a case, the first range may be selected based on criteria related to the user files to be classified, and the states into which the user files are to be classified.

For example, if the states relate to a cycle or series of events, the system may select the range based on whether or not the total number of states in the cycle or series has been met. If the number has been met, the system may select a first stochastic model, whereas if the number has not been met, the system may select a second stochastic model. For example, if the total number of states is ten, the system may select a first stochastic model if the total number of periodic status checks is eleven or more. Likewise, if the total number of periodic status checks is six to ten, the system may select a second stochastic model. Finally, if the total number of periodic status checks is under six, the system may apply a third stochastic model (or apply another model for determining an output).

In addition to selecting the range based on whether or not the total number of states in the cycle or series has been met, the system may select the range based on criteria related to the result of the status check. For example, the system may retrieve a result for the status check and select a model based on the result. Accordingly, the system may determine trend data and apply the stochastic models to the trend data. For example, the methods and systems described herein are particularly efficient in classifying user files in a database into states by introducing time dependency into time-homogeneous probability models when the user files may include user files exhibiting "straight-roller" characteristics. For example, a straight-roller account describes a delinquent user files that spirals downward over the course of periodic status checks from an initial state (e.g., upon creation of the file) to a delinquent state (e.g., ultimately ending with the closing of the file) with no attempt to address the downward spiral. For example, a straight-roller account may correspond to an account with a diabolical nature as described in FIG. 2 below. By selecting the range based on whether or not the total number of states in the cycle or series has been met, and based on criteria related to the result of the status check, the system may exclude straight-roller files from affecting the classification of user files in a database.

In some aspects, methods and systems of improving data processing efficiency of classifying user files in a database into disparate states by introducing time dependency into time-homogeneous probability models are described. For example, the system may receive a request to determine respective probabilities that a user record for a user belongs to each of a plurality of user record states, wherein the plurality of user record states comprises user record states defined by a time period for which the user record has been delinquent. The system may then retrieve a user record history for the user record, wherein the user record history comprises periodic status checks. The system may then generate a feature input for the user record history based on a respective user record status at each of the periodic status checks. The system may then determine a number of the periodic status checks in the user record history. The system may then select a first stochastic probability model of a plurality of stochastic probability models based on the number of the periodic status checks in the user record history corresponding to a first range. The system may then process the feature input using the first stochastic probability model. The system may receive a first output of the first stochastic probability model indicating the respective probabilities that the user record for the user belongs to each of the plurality of user record states. The system may then generate a recommendation based on the first output.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification, and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
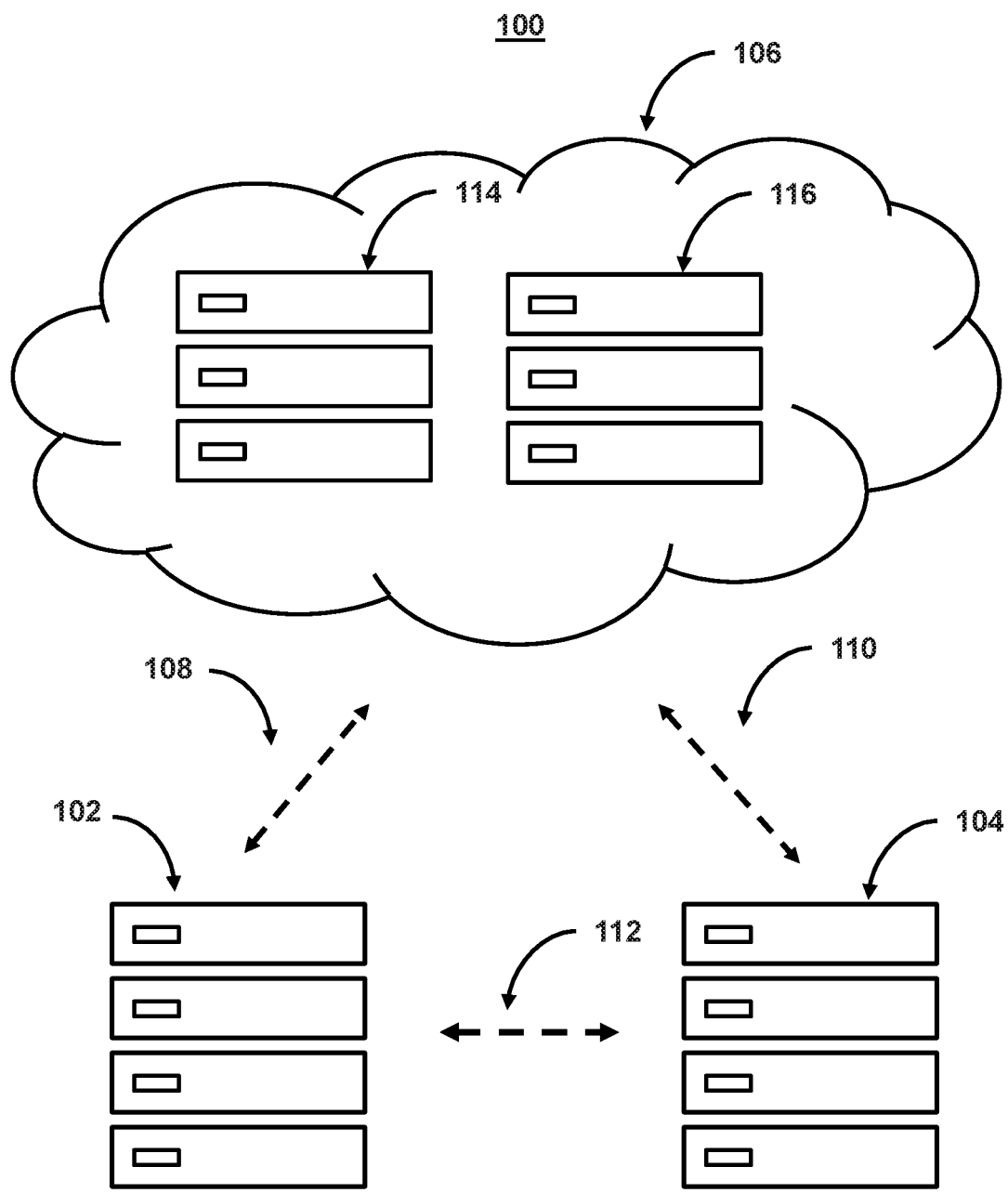
FIG. 1 shows an illustrative system for improving data processing efficiency of classifying user files in a database into disparate states by introducing time dependency into time-homogeneous probability models, in accordance with one or more embodiments.

FIG. 1 shows an illustrative system for improving data processing efficiency of classifying user files in a database into disparate states by introducing time dependency into time-homogeneous probability models, in accordance with one or more embodiments. FIG. 1 shows a system 100 for improving data processing efficiency, in accordance with one or more embodiments. As shown in FIG. 1, system 100 may include client device 102, client device 104 (or client devices 104a-104n), or other components. Each of client devices 102 and 104 may include any type of mobile terminal, fixed terminal, or other device. Each of these devices may receive content and data via input/output (hereinafter "I/O") paths, and may also include processors and/or control circuitry to send and receive commands, requests, and other suitable data using the I/O paths. As an example, while one or more operations are described herein as being performed by components of client device 102, those operations may, in some embodiments, be performed by components of client device 104. It should be noted that, although some embodiments are described herein with respect to machine learning models, other prediction models (e.g., statistical models or other analytics models) may be used in lieu of, or in addition to machine learning models in other embodiments (e.g., a statistical model replacing a machine learning model, and a non-statistical model replacing a non-machine-learning model in one or more embodiments).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 5G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In FIG. 1, client device 102 may represent the client device of a first cloud services recipient. For example, the cloud service may be made available to multiple client devices (e.g., end users) on demand via the Internet (e.g., path 108 or 110) from a cloud services provider's servers (e.g., server 114 and server 116) as opposed to end users using servers at the end user's location and/or owned by the end user. It should be noted that cloud service 106 includes servers 114 and server 116; however, cloud service 106 may include additional components. In some embodiments, server 114 and server 116 may represent edge servers that are geographically close to a client device. In such embodiments, edge server 114 and edge server 116 may be further connected to a central server in cloud service 106. The central server may assign and select server 114 and/or server 116 to a given client device, application, and/or end user based on the geographic location of the client device with respect to the edge server, based on the network conditions, along a given network path, and/or other quality of service conditions on the network.

Cloud service 106 may be structured according to one or more service-oriented architecture models. For example, cloud service 106 may be designed to provide easy, scalable access to applications, resources and services, and are designed to fully managed cloud services provider. In particular, cloud service 106 may dynamically scale to meet the needs of client device 102 and client device 104. In some embodiments, the cloud service 106 may supply some or all cloud resources (e.g., hardware and software necessary for all or some of the operation of one or more cloud services) to cloud services recipient. The cloud services provider may provide cloud services, such as online data storage and backup solutions, Web-based e-mail services, hosted office suites and document collaboration services, database processing, managed technical support services, and/or general computer power and data processing. In some embodiments, the cloud resource may be a network, server, storage device, application, and/or service.

For example, cloud service 106 may be structured according to an infrastructure as a service ("IaaS") model, in which online services that provide high-level APIs used to dereference various low-level details of underlying network infrastructure like physical computing resources, location, data partitioning, scaling, security, backup etc. In such embodiments, a hypervisor runs the virtual machines as guests, and pools of hypervisors within the cloud operational system can support large numbers of virtual machines, and the ability to scale services up and down according to the end users varying requirements. In such embodiments, the client device may deploy and run arbitrary software, which can include operating systems and applications. While the client device does not manage or control the underlying cloud infrastructure, it may have control over operating systems, storage, and deployed applications. IaaS-cloud providers supply these resources on-demand from their large pools of equipment installed in data centers. For wide-area connectivity, customers can use either the Internet or carrier clouds (dedicated virtual private networks). To deploy their applications, cloud users install operating-system images and their application software on the cloud infrastructure. In this model, the end user patches and maintains the operating systems and the application software, and the end user has access to virtual machines, servers, storage, load balances, etc.

Cloud service 106 may also be structured as a platform as a service ("PaaS") model. In such embodiments, cloud service 106 deploys onto the cloud infrastructure consumer-created or acquired applications created using programming languages, libraries, services, and tools supported by the cloud services provider. The end user does not manage or control the underlying cloud infrastructure, including network, servers, operating systems, or storage, but they do have control over the deployed applications, and possibly configuration settings for the application-hosting environment. In this model, the end users do not manage or control the underlying cloud infrastructure, including network, servers, operating systems, or storage, but have control over the deployed applications, and possibly configuration settings for the application-hosting environment, and the end user has access to execution runtime code, databases, web servers, development tools, etc.

Cloud service 106 may also be structured as a software as a service ("SaaS") model. In such embodiments, cloud service 106 allows the end users to use the cloud services provider's applications running on a cloud infrastructure. The applications are accessible from various client devices through either a thin client interface, such as a web browser (e.g., web-based email), or a program interface. The end user does not manage or control the underlying cloud infrastructure, including network, servers, operating systems, storage, or even individual application capabilities, with the possible exception of limited user-specific application configuration settings.

Depending on the model or models used by the cloud services provider, the manner in which cloud services are apportioned may change. For example, in a PaaS model, in order to apportion the cloud service resources, the cloud service 106 may install one or more applications of the first cloud services recipient on hardware of a cloud services provider. In another example, in a SaaS model, in order to apportion the cloud service resources, cloud service 106 may set one or more limits for input/output operations per second for one or more applications of the first cloud services recipient.

It should be noted that in some embodiments, the cloud service may apportion cloud service resources according to those accustomed to other models. For example, as stated below, cloud service 106 may receive output files include specific information that allows cloud service 106 to better predict actual usage of a cloud services recipient, as well as authorized use. Because cloud service 106 is better able to classify user files in a database into disparate states by introducing time dependency into time-homogeneous probability models, cloud service 106 may apportion cloud services using techniques not accustomed to that model. For example, in a SaaS model, cloud service 106 may install one or more applications of the first cloud services recipient on hardware of a cloud services provider. In another example, in a PaaS model, in order to apportion the cloud service resources, cloud service 106 may set one or more limits for input/output operations per second for one or more applications of the first cloud services recipient.

Figure 2:
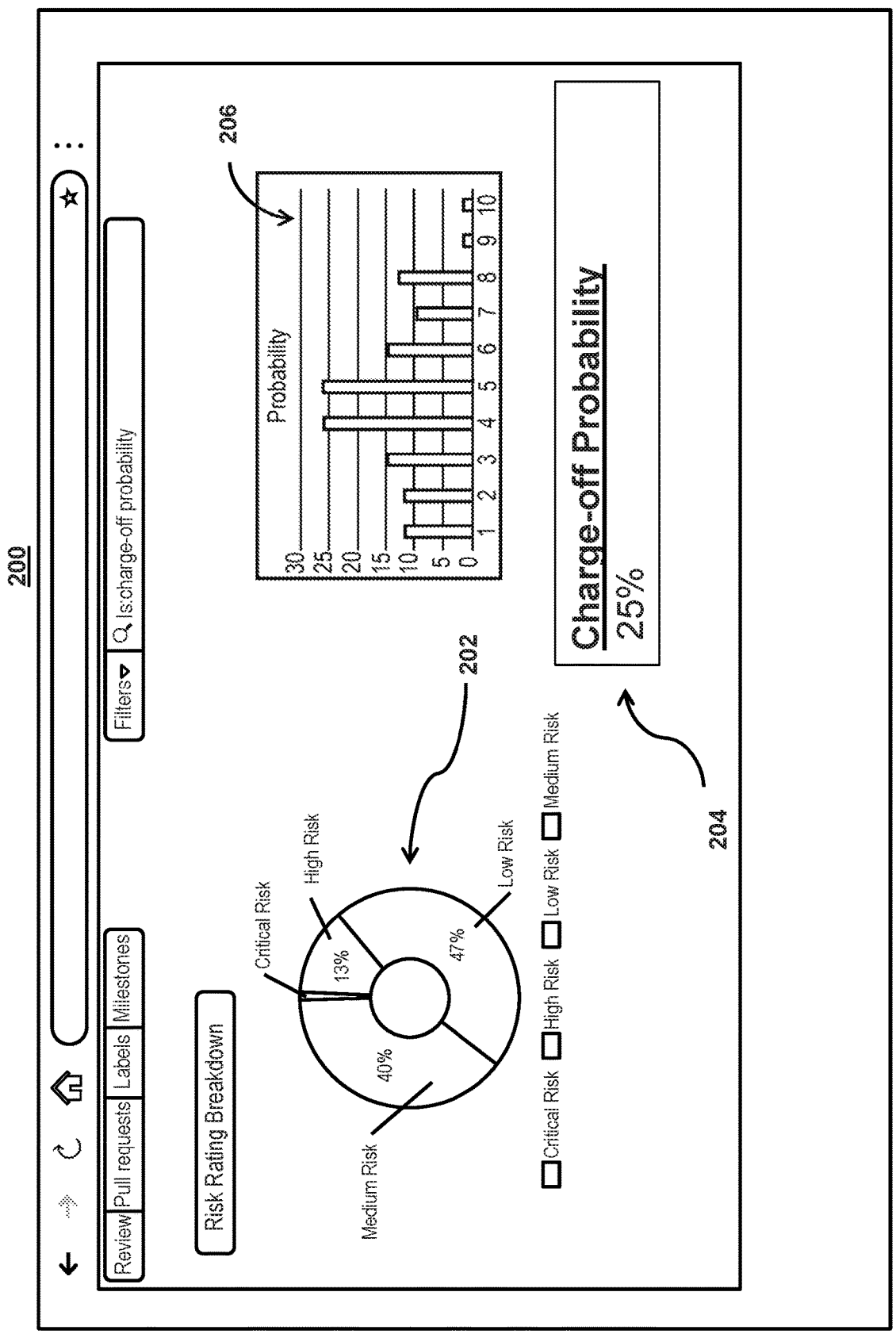
FIG. 2 shows an illustrative user interface for improving data processing efficiency of classifying user files in a database into disparate states by introducing time dependency into time-homogeneous probability models, in accordance with one or more embodiments.

FIG. 2 shows an illustrative user interface for improving data processing efficiency of classifying user files in a database into disparate states by introducing time dependency into time-homogeneous probability models, in accordance with one or more embodiments. For example, user interface 200 may represent a recommendation for classifying user files in a database into disparate states by introducing time dependency into time-homogeneous probability models. For example, graph 202 and graph 206 may include graphical representations of a probability that a user file may be classified into a given state. In another example, icon 204 may represent a textual description of a probability that a user file may be classified into a given state. In some embodiments, user interface 200 may appear on one of the devices shown in FIG. 4 below.

In some embodiments, the system may classify user files related to predicting the probability that a user account (e.g., a credit card account) may be subject to a charge-off. As described herein, a charge-off may refer to a credit card account that is more than 180 days late on its payment, and the credit issuer (e.g., a financial service provider) may consider the debt uncollectible.

For example, the system may refer to a Credit Acquisitions Leading Edge Delinquency ("LED") model predicts charge-off ("pbad") based on delinquency data ("DO") of accounts (e.g., accounts with the financial service provider) with less than or equal to 18 statements since the opening date of the account. The model may provide an independent pbad forecasts to compare against Credit Acquisitions' application stage valuations models' pbad predictions. In some embodiments, the system may perform this comparison accordingly to a predetermined schedule (e.g., every quarter) as a part of valuations model monitoring. For example, the system may monitor pbad model performance over statements for which actual data is either immature, or not yet available.

For example, conventional charge-off predictors base the likelihood of a charge-off for a given account on a credit score of an account holder at the time of opening the account. Such a prediction has a low accuracy rate. A better estimate may be achieved by looking at the actual credit history and payment history (e.g., whether or not an account holder made minimal payment over 6 months). This credit and payment history (e.g., the results of a given status check on a user file comprises delinquency data. Conventional systems may also determine how often an account has been delinquent and predict whether or not the account will be delinquent in a subsequent month based on a delinquency in a current month. However, these conventional models do not allow users to view further behavior and/or classify a user file at some point in the future. In contrast, the present model allows a user to view a status of an account at a given time (e.g., two months or more) in the future (e.g., the model includes a time dependency).

The system for improving data processing efficiency of classifying user files in a database into disparate states by introducing time dependency into time-homogeneous probability models may be particularly useful in a situation where a valuation model is either new or has recently been exposed to a previously ungrounded population. For example, the system may allow users (e.g., via user interface 200 (FIG. 2)) to gauge the model's diabolical (e.g., including straight-rollers) and post-diabolical (e.g., excluding straight-rollers) accuracy at a predetermined interval (e.g., before there are nine or more statements of data). The model may also aid in sizing the approximate PV impact of the model pbad misses.

The system for improving data processing efficiency of classifying user files in a database into disparate states by introducing time dependency into time-homogeneous probability models may be particularly useful in a situation where the existing valuations model and incoming population is well grounded. For example, the model may offer early indications of a shift in risk, as well as provide evidence that observed pbad trends are consistent with DQ data, which is not available through time-homogeneous probability models.

For example, to classify user files in a database into disparate states by introducing time dependency into time-homogeneous probability models, the model uses transition probability matrices to forecast the probability of charge-off at a given statement (e.g., a monthly credit card statement). For example, in conventional systems for the probability of moving from state i to state j $Pr(X^{(t+1)}=j|X^{(t)}=i)=p^{ij}$, the transition probability matrix P is given by using Pij as the $i^{th}$ row and $j^{th}$ column element such that for finite state space $\Sigma$ with cardinality S.

$$P = \begin{bmatrix} p_{11} & p_{12} & \cdots & p_{1S} \\ p_{21} & \ddots & & \\ \vdots & & \ddots & \\ p_{S1} & & & p_{SS} \end{bmatrix}$$

The distribution over states may be written as a probability distribution vector $x^{(t)}$ of length S at time t. To forecast the future state distribution of $x^{(t)}$ n statements in advance. For example, the model outlines the relation that is the conditional probability distribution of future states of the process depends only upon the present state, and not on the sequence of events that preceded it.

$$x^{(t+1)} = x^{(t)}P \quad (1)$$
$$\therefore x^{(t+n)} = (x^{(t+n-1)}P)P$$
$$= x^{(t+n-1)}P^2$$
$$= x^{(t)}P^n$$

$\forall t, n$ under the Markov property $$Pr(X^{(t+1)} \mid X^{(1)} = x^{(1)}, X^{(1)} = x^{(1)}, \ldots, X^{(t)} = x^{(t)}) = Pr(X^{(t+1)} \mid X^{(t)} = x^{(t)})$$

For the purposes of model, the system may have a defined the state space $\Sigma$ as $$\sum = \{DQ_0, DQ_1, DQ_2, DQ_3, DQ_4, DQ_5, DQ_6, DQ_7, CO, BK, CL\}$$

with cardinality 11. The feature space may include values for a time period for which the account is delinquent, entered a charge-off ("CO"), entered bankruptcy ("BK"), or is closed ("CL"). In some embodiments, the system may also include a paid-off account ("PO"), which may correspond to an account without delinquency (e.g., $DQ_0$).

For an account at statement t, the probability distribution row vector x(t) is given by x(t)=[P0(t), P1(t), . . . , P11(t)] where Pi(t) is the probability that account x is in state i at statement t. For example, an account in statement 8 that is currently DQ1 is given by x (8)=[0, 1, 0, 0, 0, 0, 0, 0, 0, 0, 0].

It should be noted that the model deviates from a formal definition of a time-homogeneous Markov chain as transition probability matrix P (t) is conditional on the statement t to account for differences in behavior between pre- and post-diabolical risk, such that $$P^{(t)} = \begin{cases} P_1, & \text{if } 6 \le t \le 10 \\ P_2, & \text{if } t \ge 11 \end{cases} \quad (2)$$

For example, to forecast the future conditional probability distribution row vector x(t+n) of account x at statement t and n statements forward, the system uses the same relation from (1) with conditional P(t) outlined in (2)

$$x^{(t+n)} = x^{(t)} P^{(t)} P^{(t+1)} P^{(t+2)} \ldots P^{(t+n-1)} \quad (3)$$

For example, by limiting the use of one of the models to a number of statements equal to or less than 11, the system excludes straight-roller accounts. For example, a straight-roller account may describe a delinquent credit card account that spirals downward as it goes from current, to 30 days late, to 60 and 90 days past due, and so on with no attempt to make payments.

Notably, the system may apply the same stochastic probability models more than once. For example, the system may chain the model N times. By doing so, the system may effectively increment the time period by N. For example, if the system is currently at a time period corresponding to the eleventh month 11, the system may be applied to predict an account state for the twelfth month by applying the appropriate stochastic probability model to the actual data of the eleventh month. Subsequently, the system may apply the selected stochastic probability model again to the twelfth month result (e.g., a prediction of the account state at the twelfth) month to obtain the thirteenth month result (e.g., a prediction of the account state at the thirteenth month). The system may then apply iterations until a threshold iteration is detected. The system may then stop iterating. For example, the threshold iteration may correspond to an iteration where accuracy of the data is below a threshold level. For example, the system may terminate at the sixth iteration.

Figure 3:
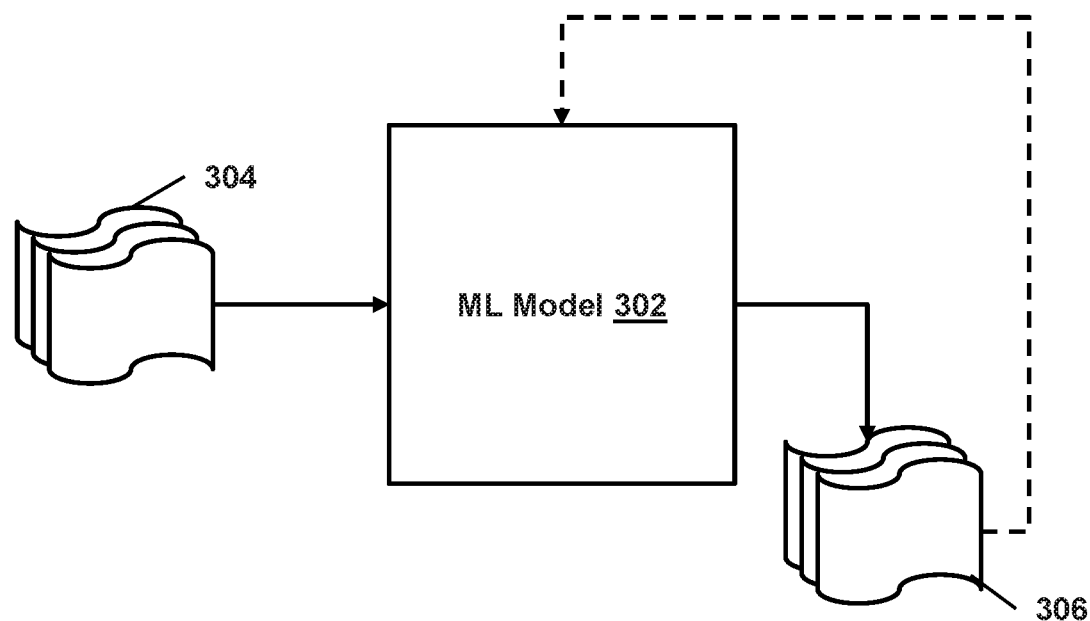
FIG. 3 shows an illustrative machine learning model for classifying user files in a database into disparate states by introducing time dependency into time-homogeneous probability models, in accordance with one or more embodiments.

FIG. 3 shows an illustrative machine learning model for classifying user files in a database into disparate states by introducing time dependency into time-homogeneous probability models, in accordance with one or more embodiments. For example, FIG. 3 shows system 300. For example, system 300 may use one or more prediction models to classify user files in a database into disparate states by introducing time dependency into time-homogeneous probability models. In some embodiments, the system may implement time-homogeneous probability models with the time dependency introduced into one or more neural networks, or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function, which combines the values of all of its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, with respect to FIG. 3, machine learning model 302 may take inputs 304, and provide outputs 306. For example, inputs may include information received from output files, such as classified user files that are labeled with the classification. The labeled outputs 306 may be fed back to machine learning model 302 as input to train machine learning model 302 (e.g., alone, or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306), and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

Figure 4:
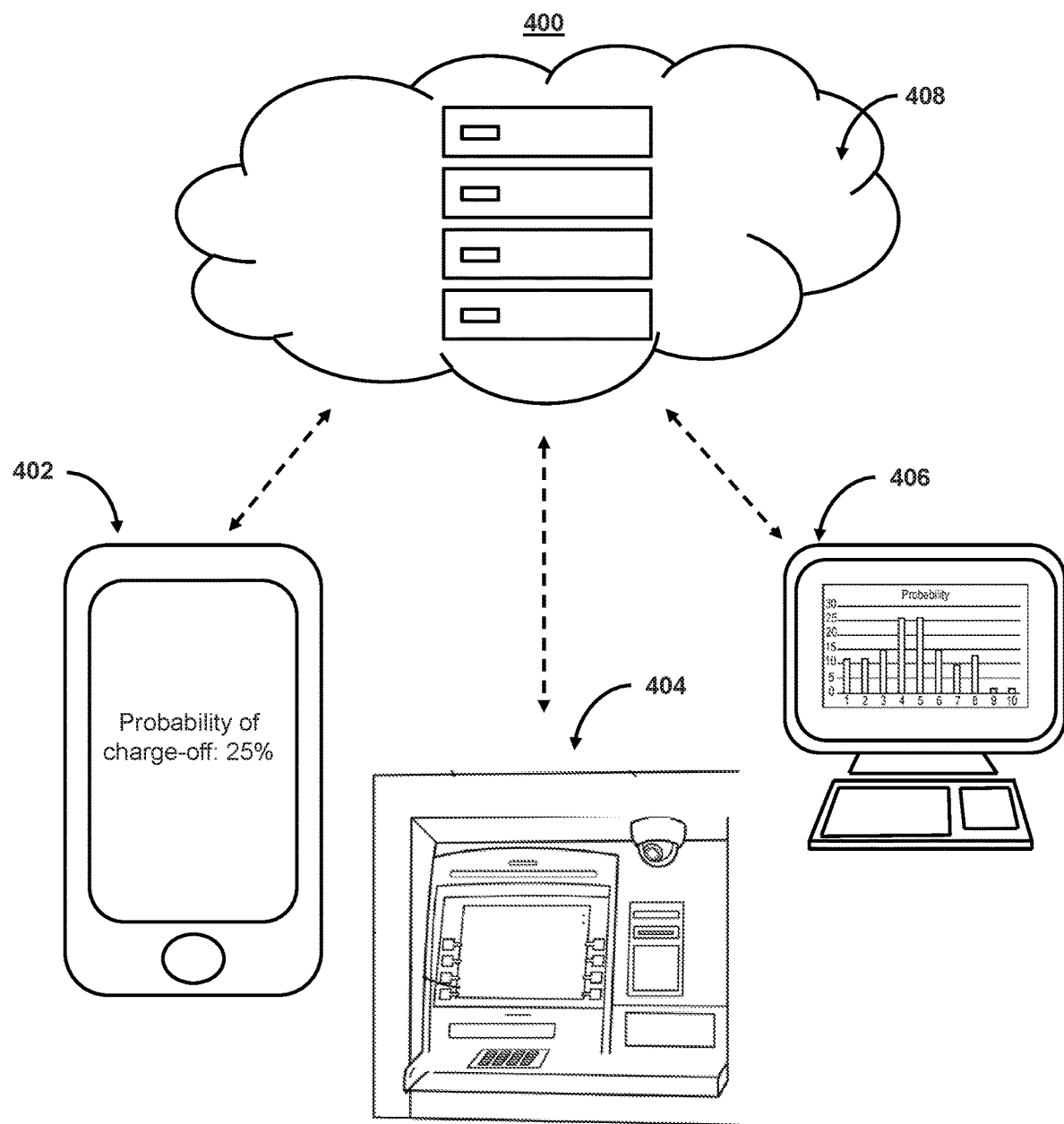
FIG. 4 shows illustrative devices for generating outputs related to classifying user files in a database into disparate states by introducing time dependency into time-homogeneous probability models, in accordance with one or more embodiments.

FIG. 4 shows illustrative devices for generating outputs related to classifying user files in a database into disparate states by introducing time dependency into time-homogeneous probability models, in accordance with one or more embodiments. As shown in FIG. 4, system 400 may include mobile device 402, automated teller machine 404, and user terminal 406. While shown as a smartphone and personal computer, respectively, in FIG. 4, it should be noted that mobile device 402 and user terminal 406 may be any computing device, including, but not limited to, a laptop computer, a tablet computer, a hand-held computer, other computer equipment (e.g., a server), including "smart," wireless, wearable, and/or mobile devices. FIG. 4 also includes server 408. Server 408 may alternatively be any computing device as described above and may include any type of mobile terminal, fixed terminal, or other device. For example, server 408 may be implemented as a cloud computing system, and may feature one or more component devices. It should also be noted that system 400 is not limited to three devices. Users may, for instance, utilize one or more other devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of mobile device 402, those operations may, in some embodiments, be performed by components of server 408.

With respect to the components of mobile device 402, ATM 404, user terminal 406, and server 408, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 4, both mobile device 402, ATM 404, and user terminal 406 include a display upon which to display data. Additionally, as mobile device 402, ATM 404, and user terminal 406 are shown as touchscreen smartphones, these displays also act as user input interfaces. It should be noted that in some embodiments, the devices may have neither user input interface nor displays, and may instead receive and display content using another device (e.g., a dedicated display device such as a computer screen and/or a dedicated input device, such as a remote control, mouse, voice input, etc.). Additionally, the devices in system 100 may run an application (or generate outputs based on classifying user files in a database into disparate states by introducing time dependency into time-homogeneous probability models. Each of these devices may also include electronic storages as described in relation to FIG. 1.

Server 408 may be a database configured to store user data for a user. For example, the database may include user data that the system has collected about the user through prior transactions. Alternatively or additionally, the system may act as a clearing house for multiple sources of information about the user. Server 408 may also include control circuitry configured to perform the various operations needed to verify the identity of a user through contextual knowledge-based authentication. For example, server 408 may receive, from mobile device 402, ATM 404, or user terminal 406, an authentication request for a user.

In some embodiments, a request to classify user files in a database into disparate states by introducing time dependency into time-homogeneous probability models may be structured as an API request that includes a URL, body, and method. The API request may correspond to one half of the API request-response cycle between one or more devices and/or applications to complete the request. For example, the system (e.g., mobile device 402 and server 408) may communicate in HTTP (Hyper Text Transfer Protocol) through a request-response cycle. To make a valid request, the requester (e.g., mobile device 02) may include a URL (Uniform Resource Locator), method, list of headers, and/or body. The URL may indicate to the verification service what resources to use (e.g., "UserFileClassify"). The body may contain headers and data. The headers may provide metadata about the request (e.g., the name of the requester, the user account for which access is needed, etc.) and the body may indicate the name of the user file needing classification.

For example, ATM 404 may be an electronic banking outlet that allows a user to complete basic transactions without the aid of a branch representative or teller. ATM 404 may allow any user with a credit card or debit card to receive cash and/or perform financial actions such as deposits, cash withdrawals, bill payments, and transfers between accounts. Furthermore, ATM 404 may include a card printer and may provide real-time access to credit cards. For example, the system may determine whether or not a user is likely to be subject to a charge-off. If not, the system may approve a credit card application and print a credit card for the user.

Figure 5:
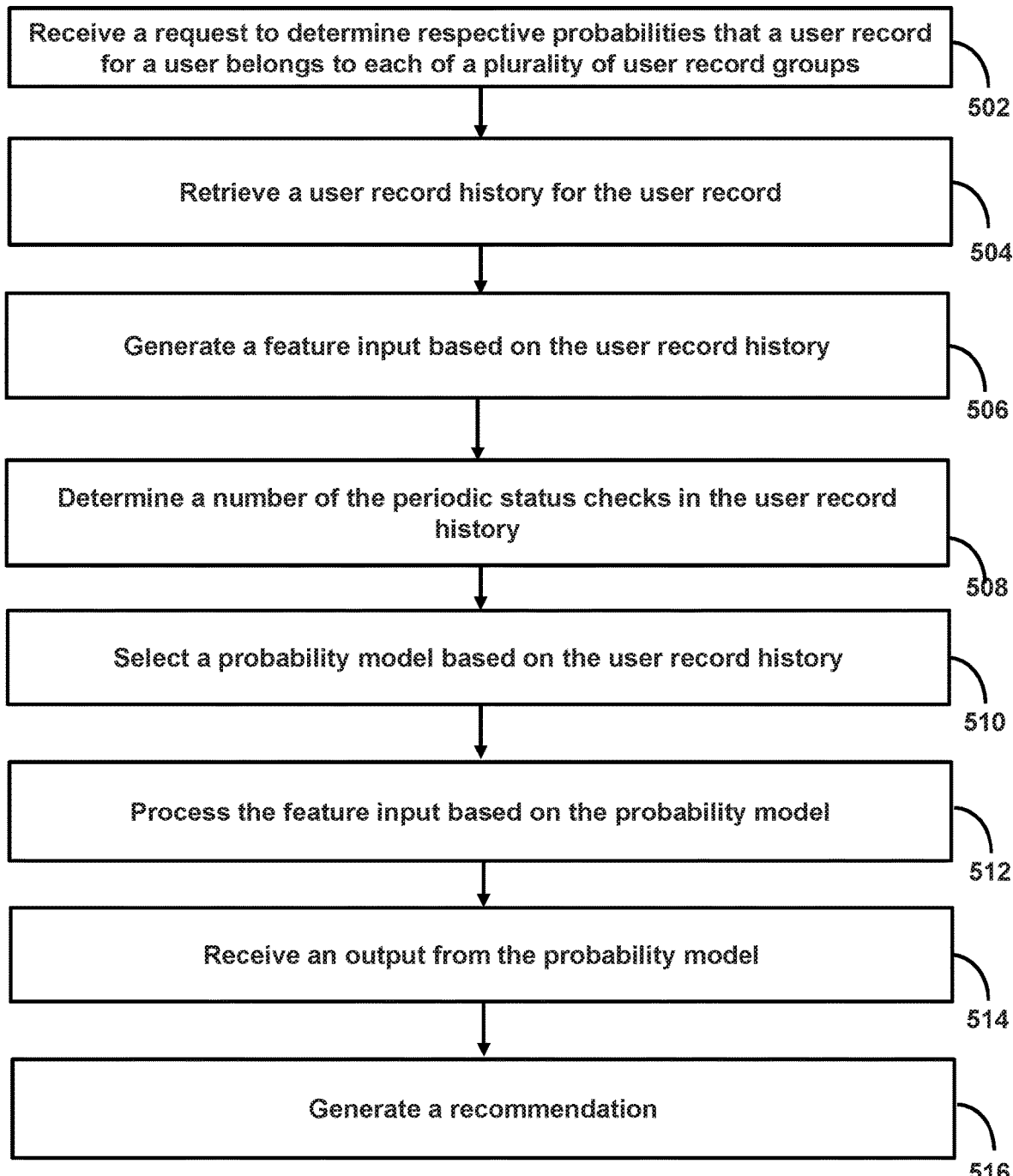
FIG. 5 shows a flowchart of the steps involved in processing cyber incidents in classifying user files in a database into disparate states by introducing time dependency into time-homogeneous probability models, in accordance with one or more embodiments.

FIG. 5 shows a flowchart of the steps involved in processing cyber incidents in classifying user files in a database into disparate states by introducing time dependency into time-homogeneous probability models, in accordance with one or more embodiments. For example, process 500 may represent the steps taken by one or more devices as shown in FIGS. 1-4.

At step 502, process 500 receives (e.g., using control circuitry) a request to determine respective probabilities that a user record for a user belongs to each of a plurality of user record states. For example, the system may receive a request to determine respective probabilities that a user record for a user belongs to each of a plurality of user record states, wherein the plurality of user record states comprises user record states defined by a time period for which the user record has been delinquent. For example, the system may receive a request to determine respective probabilities that a credit account for a user belongs to each of a plurality of account states, wherein the plurality of account states includes account states defined by a number of monthly statements for which the credit account has been delinquent.

At step 504, process 500 retrieves (e.g., using control circuitry) a user record history for the user record. For example, the system may retrieve a user record history for the user record, wherein the user record history comprises periodic status checks. For example, the system may retrieve an account history for the credit account, wherein the account history comprises the monthly account statements.

At step 506, process 500 generates (e.g., using control circuitry) a feature input based on the user record history. For example, the system may generate a feature input for the user record history based on a respective user record status at each of the periodic status checks. For example, the system may generate a feature input for the account history based on the respective account status at each monthly statement.

At step 508, process 500 determines (e.g., using control circuitry) the number of periodic status checks in the user record history. For example, the system may determine the number of periodic status checks in the user record history. For example, the system may determine the number of monthly statements in the account history.

At step 510, process 500 selects (e.g., using control circuitry) a probability model based on the user record history. For example, the system may select a first stochastic probability model of a plurality of stochastic probability models based on the number of the periodic status checks in the user record history corresponding to a first range. For example, the system may select a first stochastic probability model (e.g., a Markov chain) of a plurality of stochastic probability models based on the number of the monthly statements in the account history corresponding to a first range. The system may use a plurality of models, ranges, and/or ranges comprising numerous different values. The ranges and values therein may be selected by the system based on a given application, state numbers, and/or other criteria. For example, the first range may correspond to a number from 6 to 10. For example, prior to receiving at least ten status checks (e.g., monthly statement), the system cannot determine if a user account corresponds to a straight-roller. Accordingly, the system uses the first stochastic probability model. In contrast, after the tenth status check (and based on the results of that status check), the system may determine that the user account does not correspond to a straight-roller. Accordingly, a second stochastic probability model may be used. By filtering the user accounts, the second stochastic probability model is not biased by straight-roller accounts. Additionally, the second stochastic probability model is not subject to any overfitting that may occur if the straight-roller accounts were included.

In some embodiments, the first range is based on the number of the user record states. For example, the user records states may comprise one or more states corresponding to an amount of time for which an account has been delinquent (e.g., one month, two months, etc.). The states may also include charge-off, bankruptcy, and/or closing of an account. Accordingly, each of these states may be represented in a row vector of the probability model (e.g., as described in FIG. 2)).

In some embodiments, the system may select a second stochastic probability model of the plurality of stochastic probability models based on the number of the periodic status checks in the user record history corresponding to a second range. For example, the second range may correspond to a number greater than 11. The system may then process the feature input using the second stochastic probability model. The system may then receive a second output of the second stochastic probability model, indicating the respective probabilities that the user record belongs to each of the plurality of user record states. The system may then generate a recommendation based on the second output.

At step 512, process 500 processes (e.g., using control circuitry) the feature input based on the probability model. For example, the system may process the feature input using the first stochastic probability model. For example, the feature input may comprise a row vector that is input into a probability model (as described in relation to FIG. 2 above). In some embodiments, the first stochastic probability model uses transition probability matrices to forecast a probability of an action related to the user record.

At step 514, process 500 receives (e.g., using control circuitry) an output from the probability model. For example, the system may receive a first output of the first stochastic probability model indicating the respective probabilities that the user record for the user belongs to each of the plurality of user record states. For example, the system may receive a first output of the first stochastic probability model indicating a probability that the credit account for the user belongs is likely to be subject to a charge-off. In some embodiments, the first output may be a probability distribution row vector.

At step 516, process 500 generates (e.g., using control circuitry) a recommendation. For example, the system may generate a recommendation based on the first output. For example, the system may generate a recommendation for whether or not to issue a credit account to a user. In some embodiments, the system may, as discussed in FIG. 2 above, provide an independent pbad forecasts to compare against Credit Acquisitions' application stage valuations models' pbad predictions.

It is contemplated that the steps or descriptions of FIG. 5 may be used with any other embodiment of this disclosure. In addition, the steps and descriptions described in relation to FIG. 5 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-4 could be used to perform one of more of the steps in FIG. 5.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of classifying user files in a database into states by introducing time dependency into time-homogeneous probability models, the method comprising: receiving a request to determine respective probabilities that a user file for a user belongs to each of a plurality of user file states, wherein the plurality of user file states comprises user file states defined by a time period for which the user file has been delinquent; retrieving a user file history for the user file, wherein the user file history comprises periodic status checks; generating a feature input for the user file history based on a respective user file status at each of the periodic status checks; determining a number of the periodic status checks in the user file history; selecting a first stochastic probability model of a plurality of stochastic probability models based on the number of the periodic status checks in the user file history corresponding to a first range; processing the feature input using the first stochastic probability model; receiving a first output of the first stochastic probability model indicating the respective probabilities that the user file for the user belongs to each of the plurality of user file states; and generating a recommendation based on the first output.

2. The method of embodiment 1, further comprising: selecting a second stochastic probability model of the plurality of stochastic probability models based on the number of the periodic status checks in the user file history corresponding to a second range; processing the feature input using the second stochastic probability model; receiving a second output of the second stochastic probability model indicating the respective probabilities that the user file for the user belongs to each of the plurality of user file states; and generating a recommendation based on the second output.

3. The method of any one of embodiments 1-2, wherein the first stochastic probability model is a Markov chain.

4. The method of any one of embodiments 1-3, wherein the first stochastic probability model uses transition probability matrices to forecast a probability of an action related to the user file 5. The method of any one of embodiments 1-4, wherein the first output is a probability distribution row vector.

6. The method of any one of embodiments 1-5, wherein the first range corresponds to a number from 6 to 10.
7. The method of embodiment 3, wherein the second range corresponds to a number greater than 11.
8. The method of any one of embodiments 1-7, wherein the first range is based on the number of the user file states.
9. The method of any one of embodiments 1-8, wherein the number of the user file states is 11.
10. The method of any one of embodiments 1-9, wherein the plurality of user file states comprises a user file state corresponding to a charge-off of the user file.
11. A tangible, non-transitory, machine-readable medium storing instructions that, when executed by a data processing apparatus, cause the data processing apparatus to perform operations comprising those of any of embodiments 1-10.
12. A system comprising: one or more processors; and memory storing instructions that, when executed by the processors, cause the processors to effectuate operations comprising those of any of embodiments 1-10.
13. A system comprising means for performing any of embodiments 1-10.
14. A system comprising cloud-based circuitry for performing any of embodiments 1-10.

What is claimed is:

1. A system for improving data processing efficiency of classifying user files in a database into disparate states by introducing time dependency into time-homogeneous probability models, the system comprising:
   cloud-based storage circuitry configured to store a user record for a user;
   cloud-based control circuitry configured to:
      receiving a request to determine respective probabilities that the user record for a user belongs to each of a plurality of user record states, wherein the plurality of user record states comprises user record states defined by a time period for which the user record has been delinquent and a user record state corresponding to a charge-off of the user record;
      retrieving a user record history for the user record, wherein the user record history comprises periodic status checks;
      determining a number of the periodic status checks in the user record history;
      selecting a first stochastic probability model of a plurality of stochastic probability models based on the number of the periodic status checks in the user record history corresponding to a first range; and
      receiving a first output of the first stochastic probability model indicating the respective probabilities that the user record for the user belongs to each of the plurality of user record states; and
   cloud-based input/output circuitry configured to generate for display, in a user interface, a recommendation based on the first output.

2. A method of improving data processing efficiency of classifying user files in a database into disparate states by introducing time dependency into time-homogeneous probability models, the method comprising:
   receiving a request to determine respective probabilities that a user record for a user belongs to each of a plurality of user record states, wherein the plurality of user record states comprises user record states defined by a time period for which the user record has been delinquent;
   retrieving a user record history for the user record, wherein the user record history comprises periodic status checks;
   determining a number of the periodic status checks in the user record history;
   selecting a first stochastic probability model of a plurality of stochastic probability models based on the number of the periodic status checks in the user record history corresponding to a first range;
   receiving a first output of the first stochastic probability model indicating the respective probabilities that the user record for the user belongs to each of the plurality of user record states; and
   generating a recommendation based on the first output.

3. The method of claim 2, further comprising:
   selecting a second stochastic probability model of the plurality of stochastic probability models based on the number of the periodic status checks in the user record history corresponding to a second range;
   processing a feature input using the second stochastic probability model;
   receiving a second output of the second stochastic probability model indicating the respective probabilities that the user record for the user belongs to each of the plurality of user record states; and
   generating a recommendation based on the second output.

4. The method of claim 2, wherein the first stochastic probability model is a Markov chain.

5. The method of claim 2, wherein the first stochastic probability model uses transition probability matrices to forecast a probability of an action related to the user record.

6. The method of claim 2, wherein the first output is a probability distribution row vector.

7. The method of claim 2, wherein the first range corresponds to a number from 6 to 10.

8. The method of claim 3, wherein the second range corresponds to a number greater than 11.

9. The method of claim 2, wherein the first range is based on the number of the user record states.

10. The method of claim 2, wherein the number of the user record states is 11.

11. The method of claim 2, wherein the plurality of user record states comprises a user record state corresponding to a charge-off of the user record.

12. A non-transitory, computer-readable medium for improving data processing efficiency of classifying user files in a database into disparate states by introducing time dependency into time-homogeneous probability models, comprising instructions that, when executed by one or more processors, cause operations comprising:
   receiving a request to determine respective probabilities that a user record for a user belongs to each of a plurality of user record states, wherein the plurality of user record states comprises user record states defined by a time period for which the user record has been delinquent, and wherein the plurality of user record states comprises a user record state corresponding to charge-off of the user record;
   retrieving a user record history for the user record, wherein the user record history comprises periodic status checks;
   determining a number of the periodic status checks in the user record history;
   selecting a first stochastic probability model of a plurality of stochastic probability models based on the number of the periodic status checks in the user record history corresponding to a first range;

receiving a first output of the first stochastic probability model indicating the respective probabilities that the user record for the user belongs to each of the plurality of user record states; and generating a recommendation based on the first output.

13. The non-transitory, computer-readable medium of claim 12, wherein the instructions further cause operations comprising:

selecting a second stochastic probability model of the plurality of stochastic probability models based on the number of the periodic status checks in the user record history corresponding to a second range;

processing a feature input using the second stochastic probability model;

receiving a second output of the second stochastic probability model indicating the respective probabilities that the user record for the user belongs to each of the plurality of user record states; and generating a recommendation based on the second output.

14. The non-transitory, computer-readable medium of claim 12, wherein the first stochastic probability model is a Markov chain.

15. The non-transitory, computer-readable medium of claim 12, wherein the first stochastic probability model uses transition probability matrices to forecast a status change related to the user record.

16. The non-transitory, computer-readable medium of claim 12, wherein the first output is a probability distribution row vector.

17. The non-transitory, computer-readable medium of claim 12, wherein the first range corresponds to a number from 6 to 10.

18. The non-transitory, computer-readable medium of claim 13, wherein the second range corresponds to a number greater than 11.

19. The non-transitory, computer-readable medium of claim 12, wherein the first range is based on the number of the user record states.

20. The non-transitory, computer-readable medium of claim 12, wherein the number of the user record states is 11.

* * * * *